(12) United States Patent
Huang

(10) Patent No.: US 10,562,499 B2
(45) Date of Patent: Feb. 18, 2020

(54) MULTIFUNCTIONAL WIPER ACCESSORIES

(71) Applicant: Jiangsu Yunrui Automotive Electrical Systems Co., LTD., Xuzhou, Jiangsu Province (CN)

(72) Inventor: Songlin Huang, Xuzhou (CN)

(73) Assignee: Jiangsu Yunrui Automotive Electrical System Co., Ltd., Xuzhou (CN)

( * ) Notice: Subject to any disclaimer, the term of this patent is extended or adjusted under 35 U.S.C. 154(b) by 86 days.

(21) Appl. No.: 15/481,843

(22) Filed: Apr. 7, 2017

(65) Prior Publication Data

US 2018/0186339 A1    Jul. 5, 2018

(30) Foreign Application Priority Data

Jan. 5, 2017   (CN) .................. 2017 1 00007912

(51) Int. Cl.
*B60S 1/40*      (2006.01)
*B60S 1/38*      (2006.01)

(52) U.S. Cl.
CPC ........... *B60S 1/4003* (2013.01); *B60S 1/3801* (2013.01); *B60S 1/4009* (2013.01); *B60S 1/4045* (2013.01); *B60S 1/381* (2013.01); *B60S 1/3806* (2013.01); *B60S 1/4067* (2013.01); *B60S 2001/3813* (2013.01); *B60S 2001/3815* (2013.01); *B60S 2001/408* (2013.01); *B60S 2001/4022* (2013.01); *B60S 2001/4058* (2013.01)

(58) Field of Classification Search
CPC ...... B60S 1/381; B60S 1/3849; B60S 1/3868; B60S 1/4003; B60S 1/4045; B60S 1/4048; B60S 1/4009; B60S 1/4016; B60S 2001/4022; B60S 2001/4058; B60S 2001/4061; B60S 2001/4051; B60S 2001/4035; B60S 2001/3813; B60S 2001/3815; B60S 2001/3843; B60S 1/3801; B60S 1/3806; B60S 1/4067
USPC ............ 15/250.43, 250.201, 250.32, 250.44
See application file for complete search history.

(56) References Cited

U.S. PATENT DOCUMENTS

| 9,260,083 B2 * | 2/2016 | Yang ..................... B60S 1/3801 |
| 2005/0166349 A1 * | 8/2005 | Nakano ................. B60S 1/3806 15/250.201 |
| 2007/0089257 A1 * | 4/2007 | Harita ................... B60S 1/3801 15/250.04 |
| 2010/0005609 A1 * | 1/2010 | Kim ....................... B60S 1/387 15/250.32 |

(Continued)

*Primary Examiner* — Gary K. Graham
(74) *Attorney, Agent, or Firm* — Bay State IP, LLC

(57) ABSTRACT

A new wiper structure with multi-functional adaptor is disclosed by this invention. Such structure consists of wiper joint, adaptor, holder, adaptor cover, two side protecting covers, one bone frame, two rivet holes, two buckles, two branches, two springs and one rubber. The accessories include Adaptor I and Adaptor II, and the adaptor covers include Adaptor Cover I and Adaptor Cover II. The feature is that: corresponding connecting hole is set on adaptor I, and bearing shaft is installed on the holder. It is clamped into the connecting hole for Adaptor I on bearing shaft. Both ends of bone frame are fitted with two protecting cover connecting holes. The bone frame and side protecting cover are matched up with convex hull and protecting cover connecting hole, and the convex hull of side protecting cover is clamped into the protecting cover connecting hole of bone frame.

15 Claims, 21 Drawing Sheets

(56) References Cited

U.S. PATENT DOCUMENTS

| | | | | |
|---|---|---|---|---|
| 2012/0167328 A1* | 7/2012 | Song | B60S 1/3801 | 15/250.361 |
| 2013/0227809 A1* | 9/2013 | Tolentino | B60S 1/3874 | 15/250.32 |
| 2014/0189974 A1* | 7/2014 | Yang | B60S 1/3801 | 15/250.32 |
| 2014/0259504 A1* | 9/2014 | Piotrowski | B60S 1/4003 | 15/250.32 |
| 2015/0329087 A1* | 11/2015 | Young, III | B60S 1/381 | 15/250.201 |
| 2016/0059829 A1* | 3/2016 | Poton | B60S 1/4009 | 15/250.32 |
| 2017/0225657 A1* | 8/2017 | Kim | B60S 1/3801 | |

* cited by examiner

MULTIFUNCTIONAL WIPER ACCESSORIES

CROSS REFERENCE TO RELATED APPLICATION

This application claims priority to and takes the benefit from Chinese Application No. 2017100007912.5 filed on Jan. 5, 2017, the contents of which are herein incorporated by reference.

TECHNICAL FIELD

The invention relates to the shape and assembly and connection methods of a new NFB wiper with multi-functional adaptors, especially a new wiper structure with multi-functional adaptors.

TECHNICAL BACKGROUND

With continuous optimization and development of the automobile wiper system, the customers impose increasingly higher requirements on wipers, and the development of wipers tends to be diversified. As the wiper types increase continuously, the holdering adaptors for wipers also become varied in the market. To install holdering wipers for cars, the customers often spend a lot of time on determining the matching between wipers and automobile accessories. Moreover, owning to the monotonous design of wiper adaptors, the customers can use a single type of wipers only, which limits the customers' right to select wiper products of other types. The monotonous structure of wiper adaptors is unfavorable for the consumers to get more and better using experience.

SUMMARY OF THE INVENTION

The invention aims to overcome shortcomings of the existing technologies, and provide a new wiper structure with multi-functional adaptors. The wiper structure makes some differences to the traditional wiper adaptors; specifically, the single matching mode of the traditional wiper adaptors is canceled, and replaced by the multiple matching modes integrated on the same type of wipers. The structure allows assembly of various wipers without replacing the adaptors, so as to realize perfect match. The structure not only allows the customers to have more choices when replacing the wiper without any additional adaptor, but also can save the cost for replacement of adaptors.

The technical scheme of the invention is a new wiper structure with multi-functional adaptors, which consists of wiper joint, adaptors, holder, adaptor covers, two side covers, a bone frame, two rivet holes, two buckles, two branches, two springs and a rubber. The adaptors include adaptor I and adaptor II, and the adaptor covers include adaptor cover I and adaptor cover II. The feature is that: the adaptor I is set with adaptor I connecting hole, and the holder is installed with bearing shaft; the bearing shaft is of semi-hollow structure with one end closed, and equipped with guide pillar casing B123 on the inner side. Besides, the bearing shaft is set with chamfers at both ends, and provided with step-down groove on one side, which is clamped into the adaptor I connecting hole at the bearing shaft for fixation and connection purpose. In addition, the holder is also used for diversion. It is set with fixture block and cushion block. The bone frame is set with slot, and two cover connecting holes at both ends respectively. The holder is joined with the bone frame via the fixture block and slot. The bone frame will be clamped into the holder, and while the bone frame contacts cushion block of the holder, the fixture block will clamp the bone frame tightly at slot of the bone frame. It features simple assembly and firm structure.

The side cover is set with buckle and convex hull on the inner side. The bone frame is joined with the side cover via the convex hull and cover connecting hole. The convex hull of the side cover will be clamped into cover connecting hole of the bone frame. It features simple structure and close fitting.

The adaptor I is also set with convex hull I, convex hull II, convex block I, convex block II, pressing block, connecting hole, U-shaped column, groove convex block, cushion block groove, shaft, buckle and slideway. The connecting hole is set on one side of the adaptor I connecting hole, and axial compression groove is set provided under the connecting hole. The slideway is located at the bottom edge of adaptor I, and convex block II is set at the outer side of the slideway.

The pressing block is set at one end on the top of adaptor I. and the U-shaped column and convex hull II are on the inner side in the middle of adaptor I. The groove convex block is set on one side of the convex hull II, and buckle I is set on both sides on the other end of adaptor I.

The adaptor cover I is set with groove and cushion block on the inner side, and also side groove in the middle. The shaft of adaptor I will be clamped into groove of adaptor cover I, and adaptor cover I will rotate along the shaft freely. After assembly, the adaptor cover will be pressed to clamp the buckle into the side groove of adaptor cover I.

The adaptor II is set with fixture block I on both sides at the front end, and also holder hole and shaft hole in the middle, with the baffle plate set on both sides at the bottom between them. The adaptor II is set with shaft I at one end and convex plate at the other end on the top. The convex hull III is set symmetrically between the holder hole and shaft hole. The adaptor II (B2I) is installed with adaptor cover II, and the adaptor cover II is set with C-shaped shaft groove and cushion block I at one end on the inner side. The adaptor cover II is also provided with side groove I (B231) at both ends on the outer side. This group of adaptors can be matched with 10 types of wiper joints. The above-mentioned wiper joints include 9*3 U-hook, 9*4 U-hook, pinch tab 22, top lock 22, side lock 22, side pin, pinch tab button, side lock 17, top lock 16 and bayonet.

The above-mentioned pinch tab is set with top convex block on the top, and slot I on both sides. The above-mentioned pinch tab button is set with fixing holes, and also provided with top convex hull on the top, pressing block in the middle, and slot II on both sides.

The above-mentioned side pin is set with shaft I on one side at the top, and the shaft is provided with a connecting shaft.

The above-mentioned side lock 17 is set with L-shaped hook, and the L-shaped hook is provided with connecting shaft I on one side.

The above-mentioned top lock 16 is set with a square convex plate hole, and provided with four groups of convex hull IV at the bottom on the inner side.

The above-mentioned bayonet is set with fixing hole at one end and round convex plate hole in the middle.

Scheme I: 9*3 U-hook can be clamped into the U-shaped column, and convex hull II will be used to fix and restrain it;

Scheme I: 9*4 U-hook can be clamped into the U-shaped column, and convex hull II will be used to fix and restrain it; Scheme III: The pinch tab can be clamped into the convex hull I, and pressed to fix it on the groove convex block;

Scheme IV: The top lock 22 can be penetrated into adaptor I along the slideway, and convex block I and convex block II will restrain forward and back movements of top lock 22;

Scheme V: The side lock can be inserted into guide pillar casing of the holder bearing shaft for fixation purpose.

Scheme IV: The side pin can be inserted into the connecting hole for connection and fixation purpose. The groove in the adaptor cover can rotate coordinately with the shaft of adaptor II, and the adaptor cover can be pressed to press the buckle into the groove for fixation purpose;

Scheme VII: The assembly scheme for pinch tab button is as follows: the slot will be clamped on convex hull I of adaptor I, and the fixture block clamped under the pressing block; besides, the pinch tab button will be pressed to clamp the top convex block into the groove convex hull structure of adaptor I, as that the assembly will be completed.

Scheme VIII: The side lock is fitted with L-shaped hook and connecting shaft I. The connecting shaft I can be inserted into the shaft hole of adaptor II, and the L-shaped hook will be clamped on the adaptor for fixation purpose.

Scheme IX: Top lock 16. Upon assembly, the top lock 16 can be penetrated into adaptor II, so that its vertical movement will be restrained by the four groups of convex hull structure, and its forward direction restrained by the baffle plate, and the convex plate will be clamped into the square convex plate hole to prevent its withdrawal.

Scheme X: The bayonet type has a round convex plate hole structure. The bayonet type will be jointed with adaptor II, and the convex plate will be clamped into the round convex plate hole, so that the four groups of convex hull will restrain its lateral swaying. The adaptor cover will be pressed at the end to press the cushion block at position A, and thus restrain its vertical movement.

The groove in the adaptor cover can rotate coordinately with the shaft of adaptor II, and the adaptor cover can be pressed to press the buckle into the groove for fixation purpose.

As the above technical schemes are used, the beneficial effect of the utility model is that the adaptors integrate the matching methods and advantages of 10 types of adaptors into the same group, and can be applied to most of the adaptors in the market. Its wide application range and high adaptability can meet more customer requirements.

DESCRIPTION OF FIGURES

The invention is further described in combination with the figures and embodiments below.

DETAILED DESCRIPTION OF THE SEVERAL EMBODIMENTS

Figure 1:
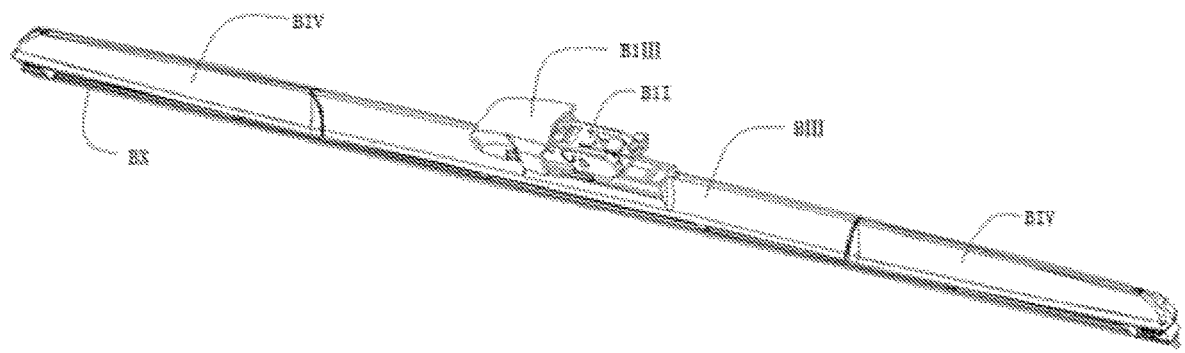
FIG. 1 is the overall structure diagram of the invention.
Figure 2:
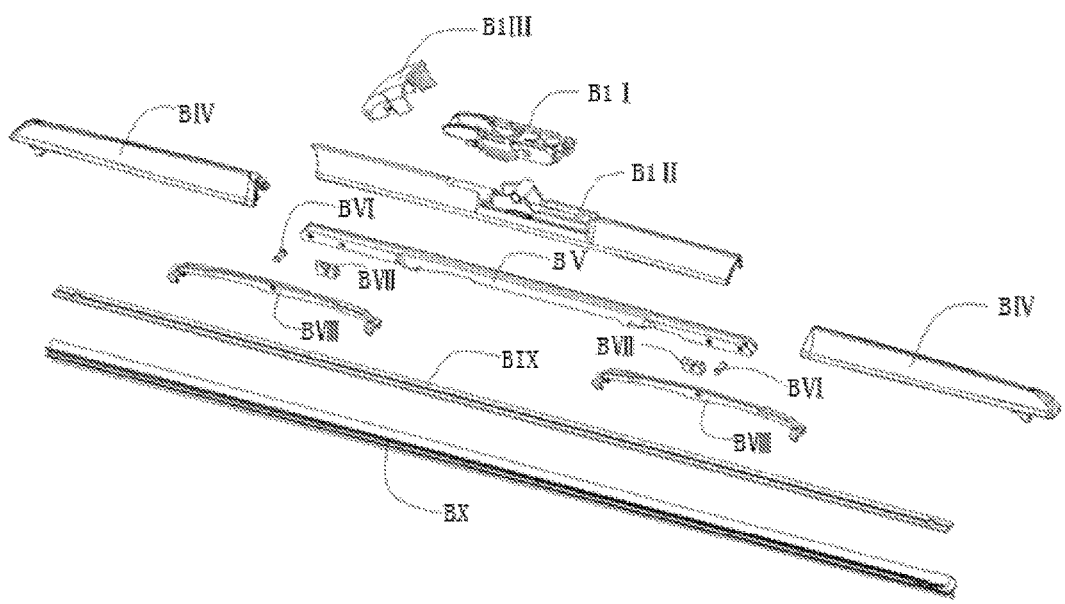
FIG. 2 is the overall exploded drawing of FIG. 1.
Figure 3:
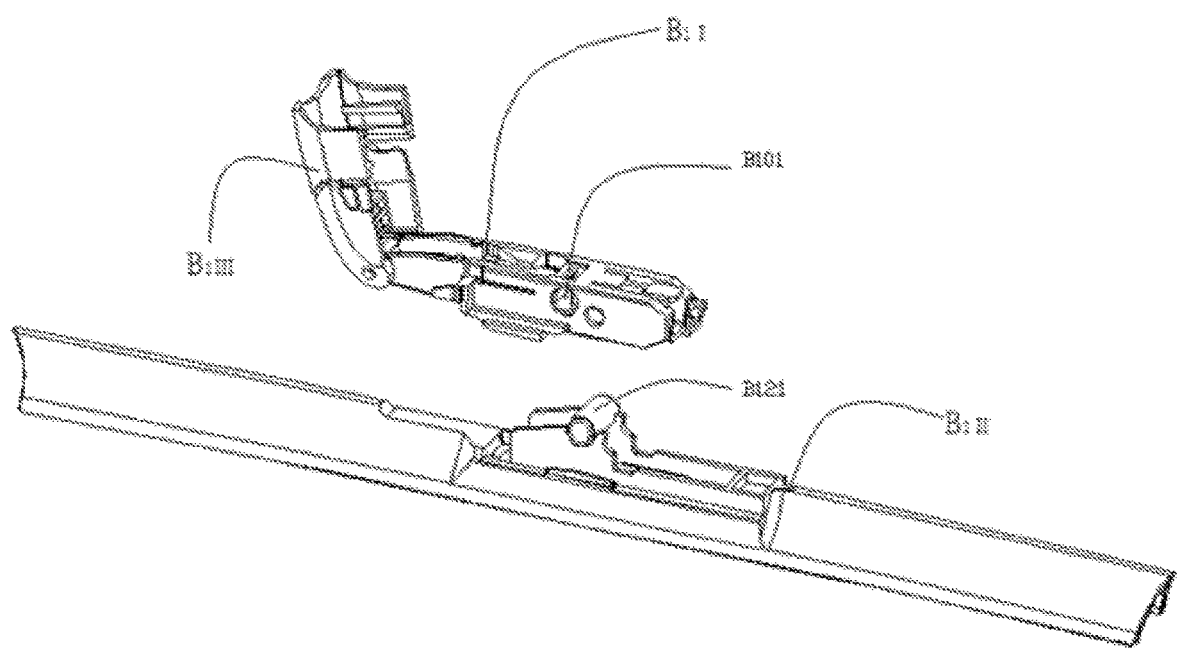
FIG. 3 is the breakdown diagram of adaptor I and holder in FIG. 1.
Figure 4:
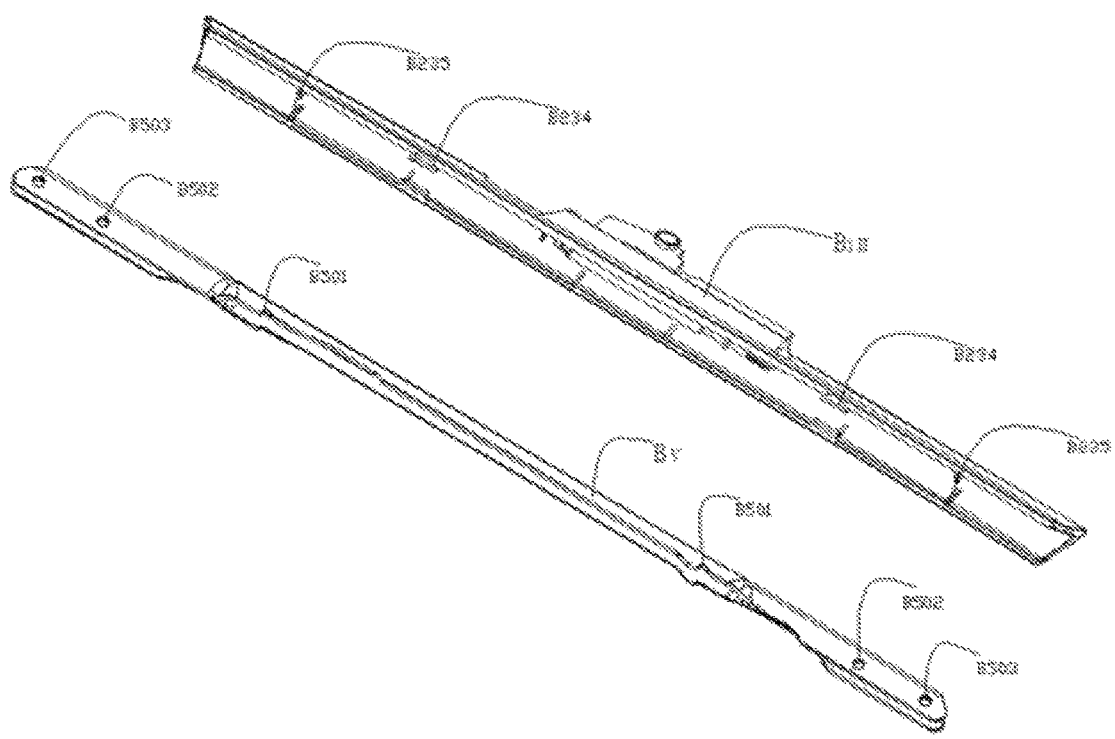
FIG. 4 is the breakdown structure diagram of the holder and flow deflector in FIG. 2.

The figures show (B1I) adaptor I, (B2I) adaptor II, (B1II) holder, (B1III) adaptor cover I, (B2III) adaptor cover II, (BIV) side cover, (BV) bone frame, (BVI) spring, (BVII) rubber, (AI) 9*3 U-hook, (AII) 9*4 U-hook (AIII) pinch tab, (AIV) top lock 22, (AV) side lock 22, (AVI) side pin, (AVII) pinch tab button, (AVIII) side lock 17, (AIX) top lock 16, (AX) bayonet, (B100) convex hull II, (B101) adaptor I connecting hole, (B102) U-shaped column, (B103) convex hull I, (B104) convex block I, (B105) connecting hole, (B106) shaft, (B107) groove convex block, (B108) convex plate, (B109) slideway, (B110) convex block II, (B111) pressing block, (B112) axial compression groove, (B113) buckle, (B114) cushion block groove, (B121) bearing shaft, (B122) step-down groove, (B123) guide pillar casing, (B131) groove, (B132) side groove, (B133) cushion block, (B200) holder hole, (B201) shaft I, (B202) fixture block I, (B203) shaft hole, (B204) baffle plate, (B205) convex hull III, (B206) convex plate I, (B231) groove, (B232) cushion block, (B233) C-shaped shaft groove, (B501) slot, (B502) rivet hole, (B503) cover connecting hole, (B504) convex hull, (B505) buckle, (A301) slot I, (A302) top convex block, (A401) L-shaped slot, (A501) L-shaped hook, (A502) guide pillar, (A601) shaft I, (A602) connecting shaft, (A701) slot II, (A702) top convex block, (A703) fixture block, (A801) L-shaped hook, (A802) connecting shaft I, (A901) convex hull IV, (A902) square convex plate hole, and (A1001) round convex plate hole.

Specific Implementation Method

According to FIGS. 1-4, the invention involves wiper joint, adaptors, holder (B1II), adaptor covers, two side covers (BIV), a bone frame (BV), two (BVI) rivet holes (B502), two buckles (BVII), two branches (BVIII), two springs (BIX) and a rubber (BX). The adaptors include adaptor I (B1I) and adaptor II (B2I), and the adaptor covers include adaptor cover I (B1III) and adaptor cover II (B2III). The adaptor I (B1I) is set with adaptor I connecting hole (B101), and the holder (B1II) is installed with bearing shaft (B121); the bearing shaft (B121) is of semi-hollow structure with one end closed, and equipped with guide pillar casing (B123) on the inner side. Besides, the bearing shaft (B121) is set with chamfers at both ends, and provided with step-down groove (B122) on one side, which is clamped into the adaptor I connecting hole (B101) at the bearing shaft (B121) for fixation and connection purpose. In addition, the holder (B1II) is also used for diversion. It is set with fixture block (B234) and cushion block (B235). The bone frame (BV) is set with slot (B501), and two cover connecting holes (B503) at both ends respectively. The holder (B1II) is joined with the bone frame (BV) via the fixture block and slot. The bone frame (BV) will be clamped into the holder (B1II), and while the bone frame (BV) contacts cushion block (B235) of the holder (B1II), the fixture block (B234) will clamp the bone frame tightly at slot (B501) of the bone frame. It features simple assembly and firm structure.

The above-mentioned adaptor I (B1I) and adaptor II (B2I) have various matching structures, and they can be matched with 10 types of wiper joints.

The above-mentioned wiper joints include 9*3 U-hook, 9*4 U-hook, pinch tab 22 (AIII), top lock 22 (AIV), side lock 22 (AV), side pin (AVI), pinch tab button (AVII), side lock 17 (AVIII), top lock 16 (AIX), and bayonet (AX), and they are commercially available products.

Figure 5:
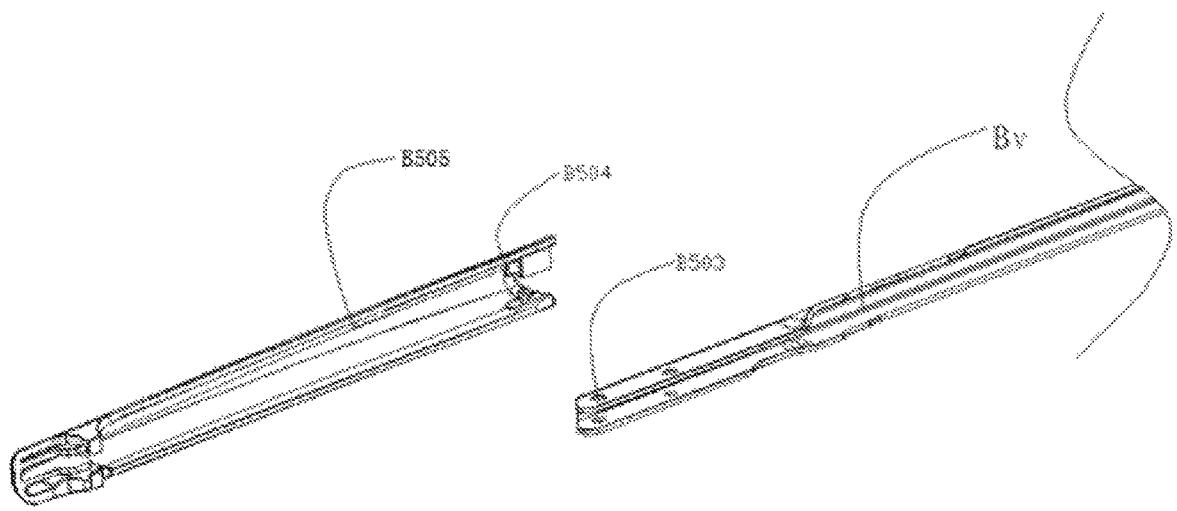
FIG. 5 is the breakdown diagram for installation of the side cover and bone frame in FIG. 2.

According to FIG. 5, the side cover (BIV) is set with convex hull (B504) on the inner side. The bone frame (BV) is joined with the side cover (BIV) via the convex hull and cover connecting hole. The convex hull (B504) of the side cover (BIV) will be clamped into cover connecting hole (B503) of the bone frame. It features simple structure and close fitting.

Figure 8:
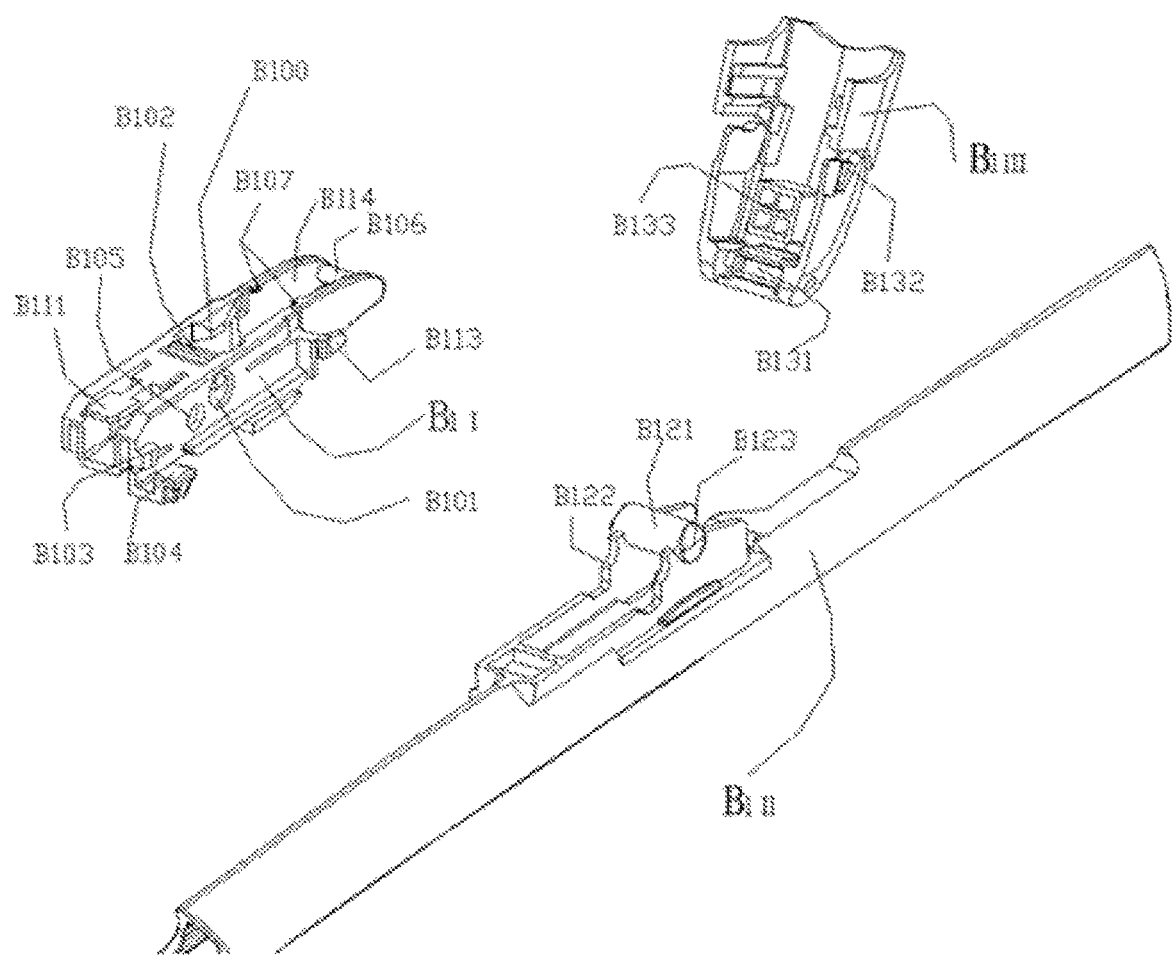
FIG. 8 is the breakdown structure diagram for installation of adaptor cover I, adaptor I and holder in FIG. 6.

According to FIG. 8, the adaptor I (B1I) is also set with convex hull I (B103), convex hull II (B100), convex block I (B104), convex block II (B110), pressing block (B111), connecting hole (B105), U-shaped column (B102), groove convex block (B107), cushion block groove (B114), shaft (B106), buckle I (B113) and slideway (B109). The connecting hole (B105) is set on one side of the adaptor I (B1II) connecting hole (B101), and axial compression groove (B112) is provided under the connecting hole (B105). The slideway (B109) is located at the bottom edge of adaptor I (B1II), and convex block II (B110) is set at the outer side of the slideway (B109).

The pressing block (B111) is set at one end on the top of adaptor I (B1II). and the U-shaped column (B102) and convex hull II (B100) are on the inner side in the middle of adaptor I (B1II). The groove convex block (B107) is set on one side of the convex hull II (B100), and buckle I (B113) is set on both sides on the other end of adaptor I (B1II).

The adaptor cover I (B1III) are set with groove (B131) and cushion block (B133) on the inner side, and also side groove (B132) in the middle. The groove (B131) in the adaptor cover I (B1III) can rotate coordinately with the shaft (B106) of adaptor I (B1☐), and the adaptor cover (B1III) can be pressed to press the buckle (B113) into the side groove (B132) for fixation purpose.

Figure 6:
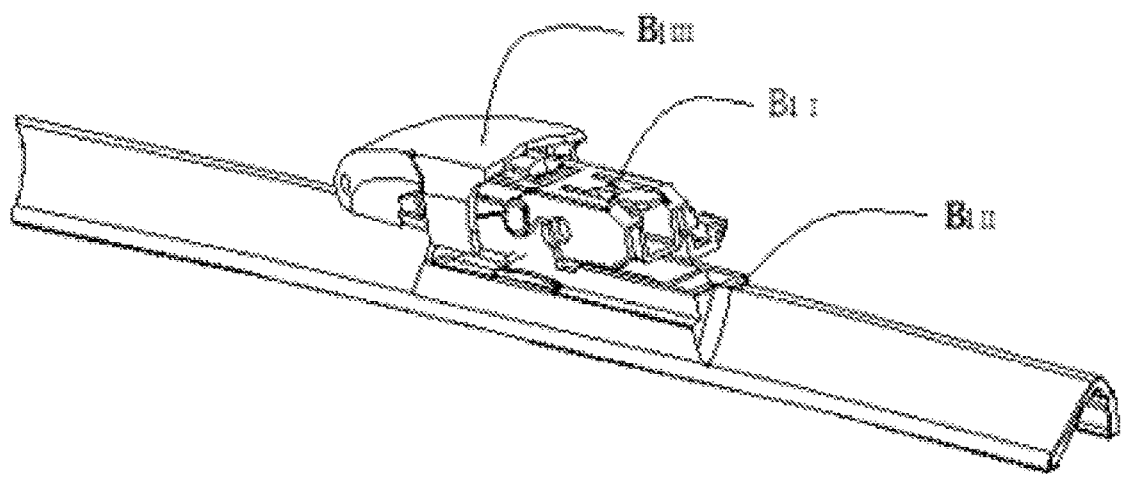
FIG. 6 is the structure diagram for installation of adaptor I and holder in FIG. 1.
Figure 7:
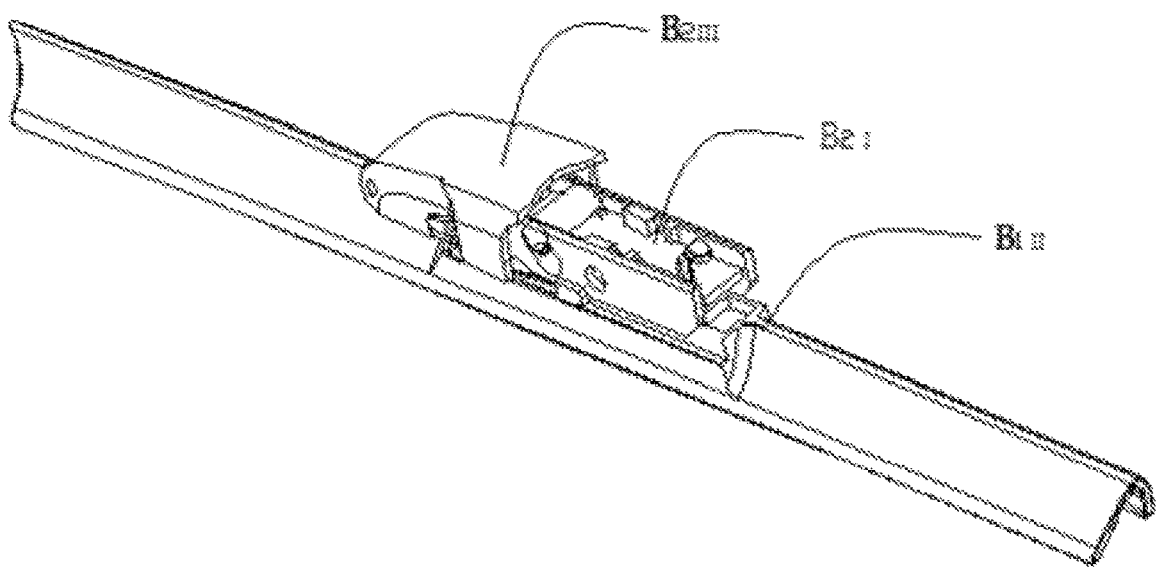
FIG. 7 is the structure diagram for installation of adaptor II and holder in FIG. 1.
Figure 9:
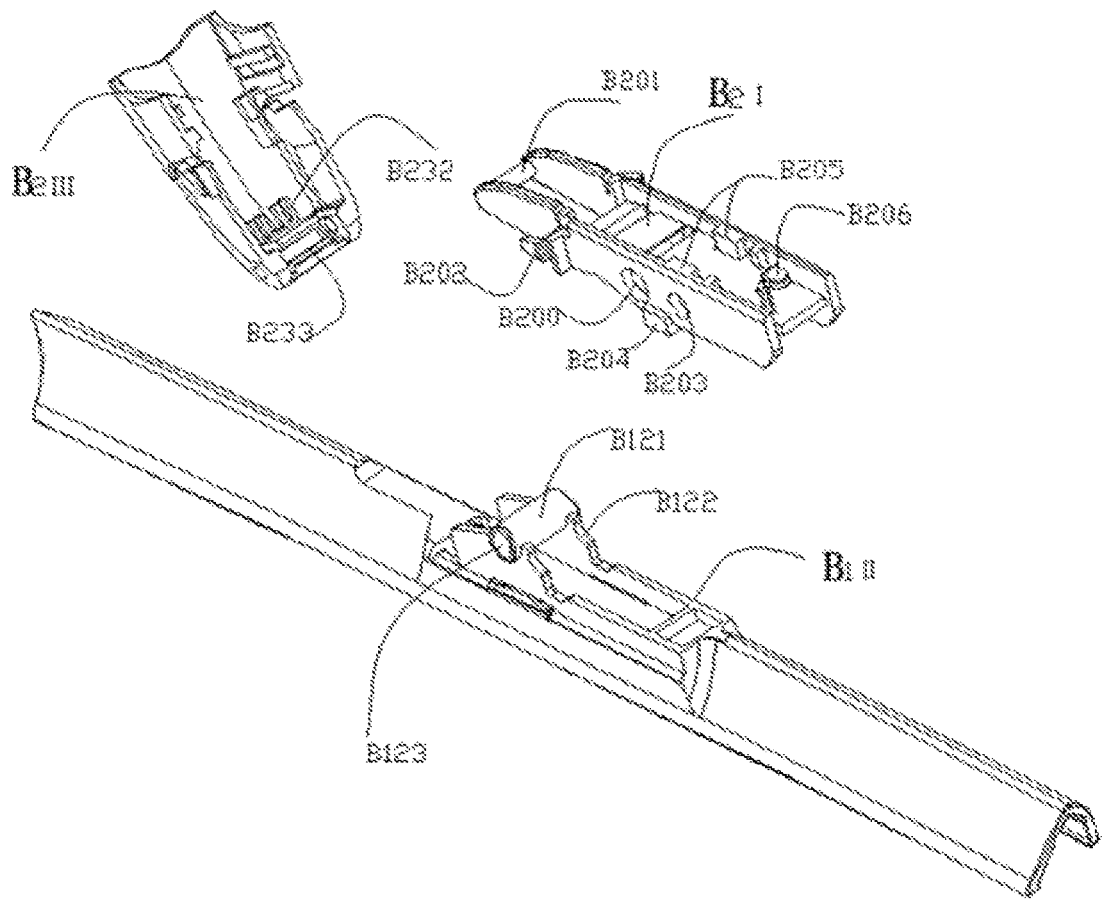
FIG. 9 is the breakdown structure diagram for installation of adaptor cover II, adaptor II and holder in FIG. 7.

According to FIGS. 6, 7 and 9, the adaptor II (B2I) is set with fixture block I (B202) on both sides on the front end, and also holder hole (B200) and shaft hole (B203) in the middle, with the baffle plate (B204) set on both sides at the bottom between them. The adaptor II (B2I) is set with shaft I (201) at one end and convex plate (B206) at the other end on the top. The convex hull III (B205) is set symmetrically between the holder hole (B200) and shaft hole (203). The adaptor II (B2I) is installed with adaptor cover II (B2III), and the adaptor cover II (B2III) is set with C-shaped shaft groove (B233) and cushion block I (B232) at one end on the inner side. The adaptor cover II (B2III) is also provided with side groove I (B231) at both ends on the outer side.

Figure 10:
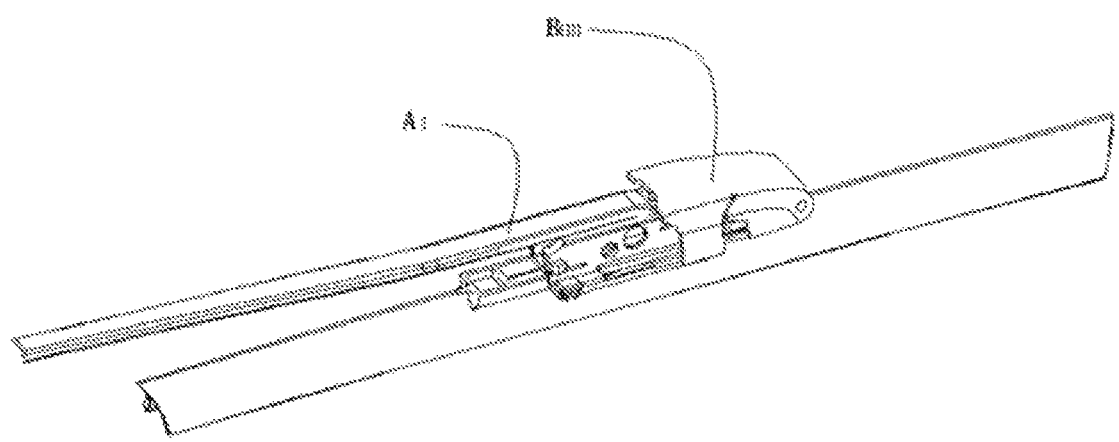
FIG. 10 is the effect diagram for assembly of adaptor I, holder and 9*3 U-hook joint in scheme I.
Figure 11:
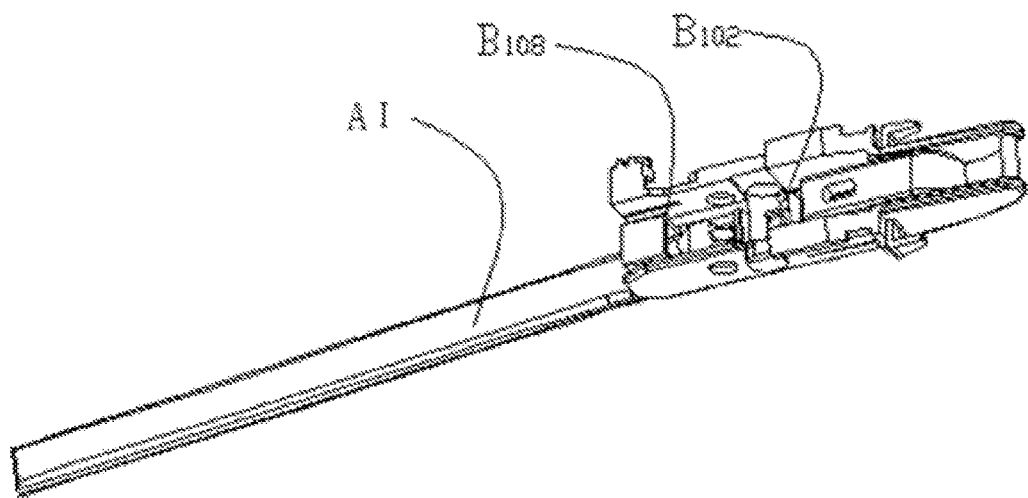
FIGS. 11 and 12 are the effect diagrams for assembly of adaptor I and 9*3 U-hook joint in scheme I.
Figure 12:
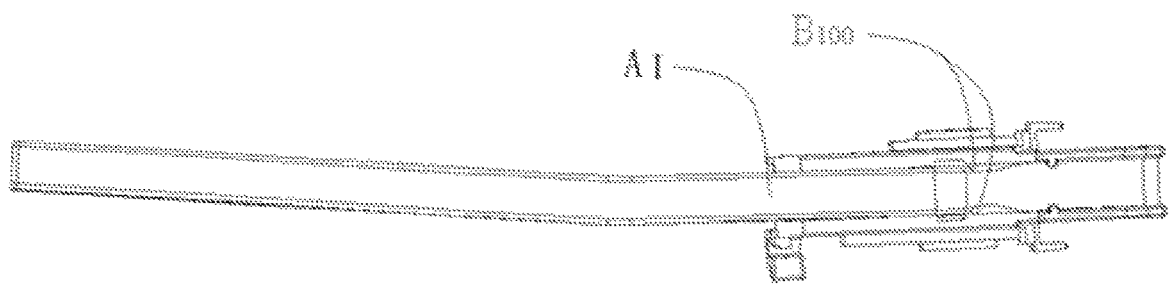
Figure 13:
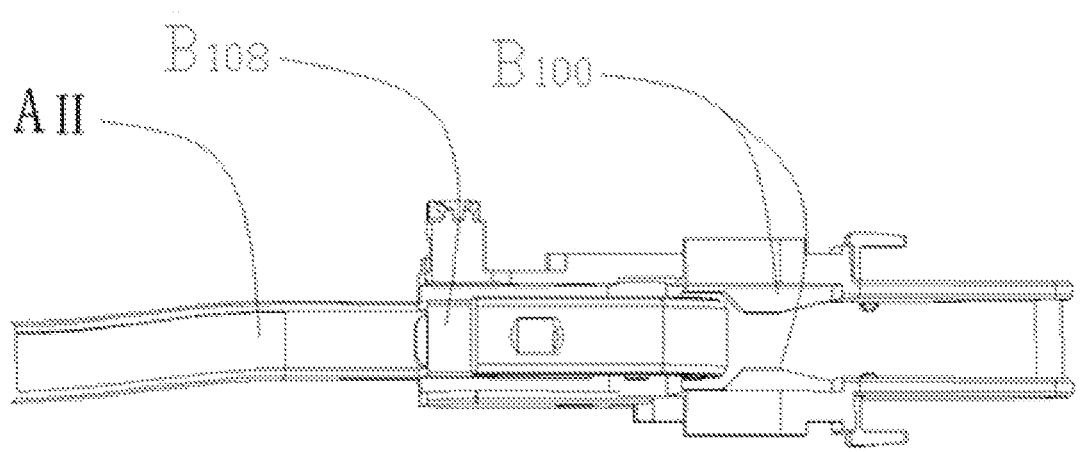
FIG. 13 is the effect diagram for assembly of adaptor I and 9*4 U-hook joint in scheme II.
Figure 14:
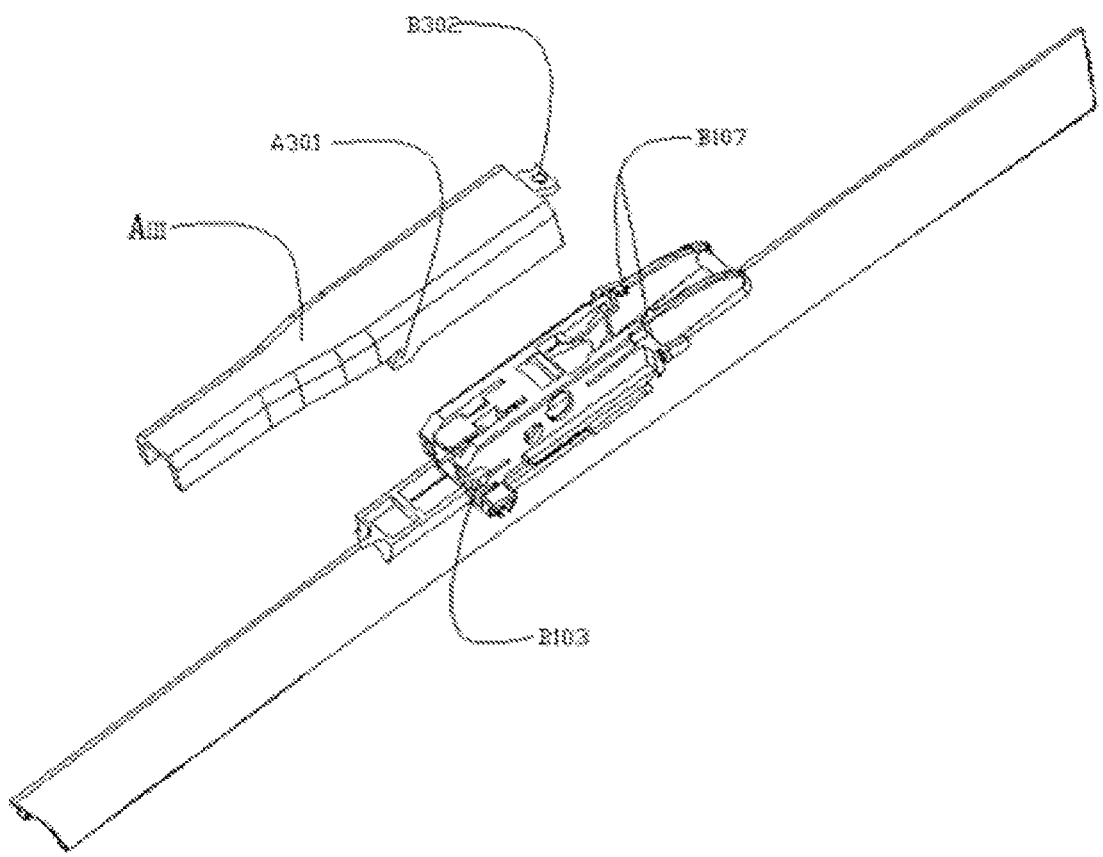
FIG. 14 is the breakdown diagram for assembly of wiper adaptor I and pinch tab in scheme III.
Figure 15:
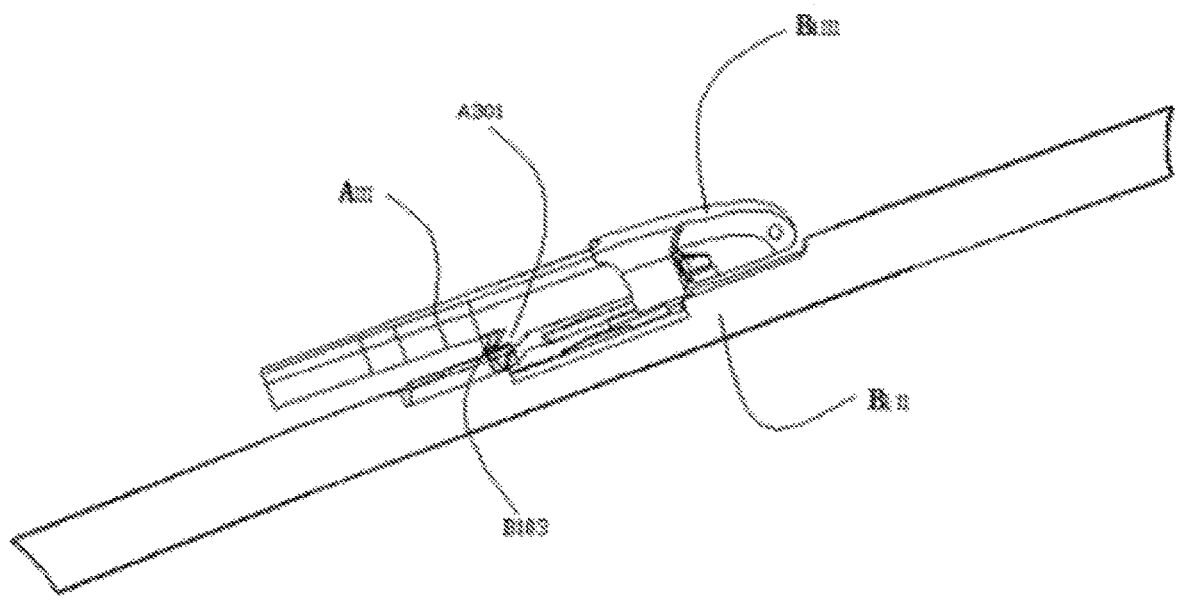
FIG. 15 is the structure diagram for installation of FIG. 14.
Figure 16:
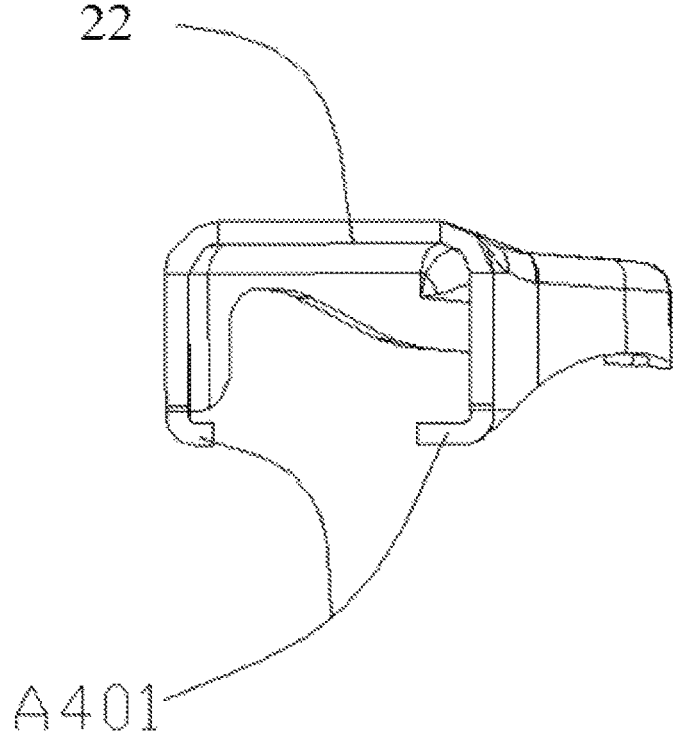
FIG. 16 is the structure diagram of top lock 22.
Figure 17:
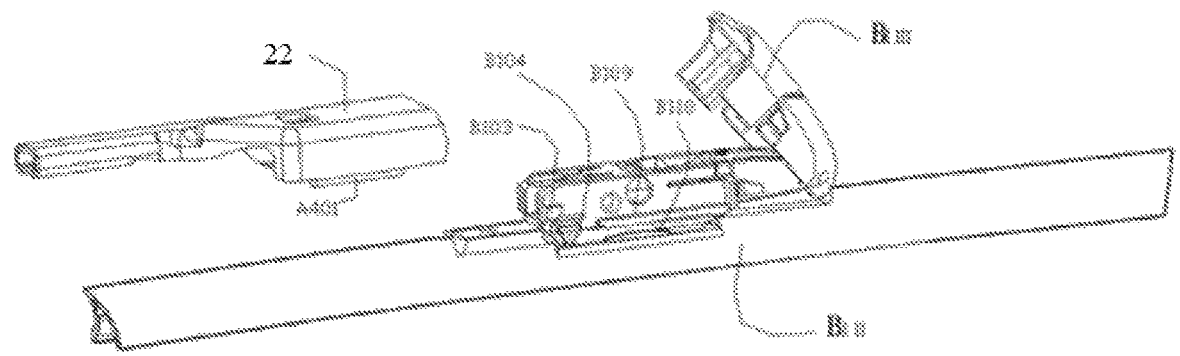
FIG. 17 is the breakdown structure diagram for installation of wiper adaptor and top lock 22 in scheme IV.
Figure 18:
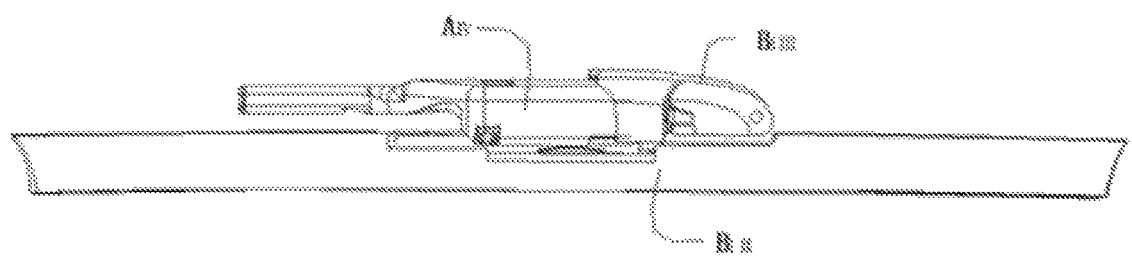
FIG. 18 is the structure diagram for installation of FIG. 17.

According to FIGS. 10-12, it shows scheme I: the 9*3 U-hook (AI) will be matched with adaptor I (B1II). 9*3 U-hook (AI) can be clamped into the U-shaped column (B102), and convex hull II (B100) will be used to fix and restrain it;

According to FIG. 13, it shows scheme II: the 9*4 U-hook (AII) will be matched with adaptor I (B1II). 9*4 U-hook (AII) can be clamped into the U-shaped column (B102), and convex hull II (B100) will be used to fix and restrain it;

According to FIGS. 14-15, it shows scheme III: the pinch tab will be matched with adaptor I (B1II). The pinch tab is set with top convex block (B302) on the top, and slot I (A301) on both sides. The pinch tab (AIII) can be clamped into the convex hull I (B103) on the adaptor I (B1II), and pressed to fix it on the groove convex block (B107) on adaptor I (B1II);

According to FIGS. 16-18, it shows scheme IV: the top lock 22 (AIV) will be matched with adaptor I (B1I). The top lock 22 (AIV) is provided with L-shaped slot (A401) on the top. The top lock 22 (AIV) can be penetrated into adaptor I (B1I) along the slideway (B109), and convex block II (B110) and convex block I (B104) will restrain forward and back movements of top lock 22 (AIV).

Figure 19:
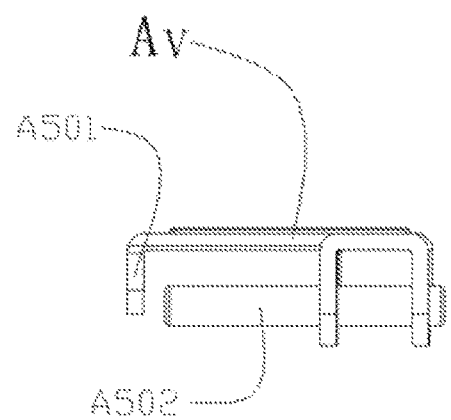
FIG. 19 is the structure diagram of side lock 22 in scheme V.
Figure 20:
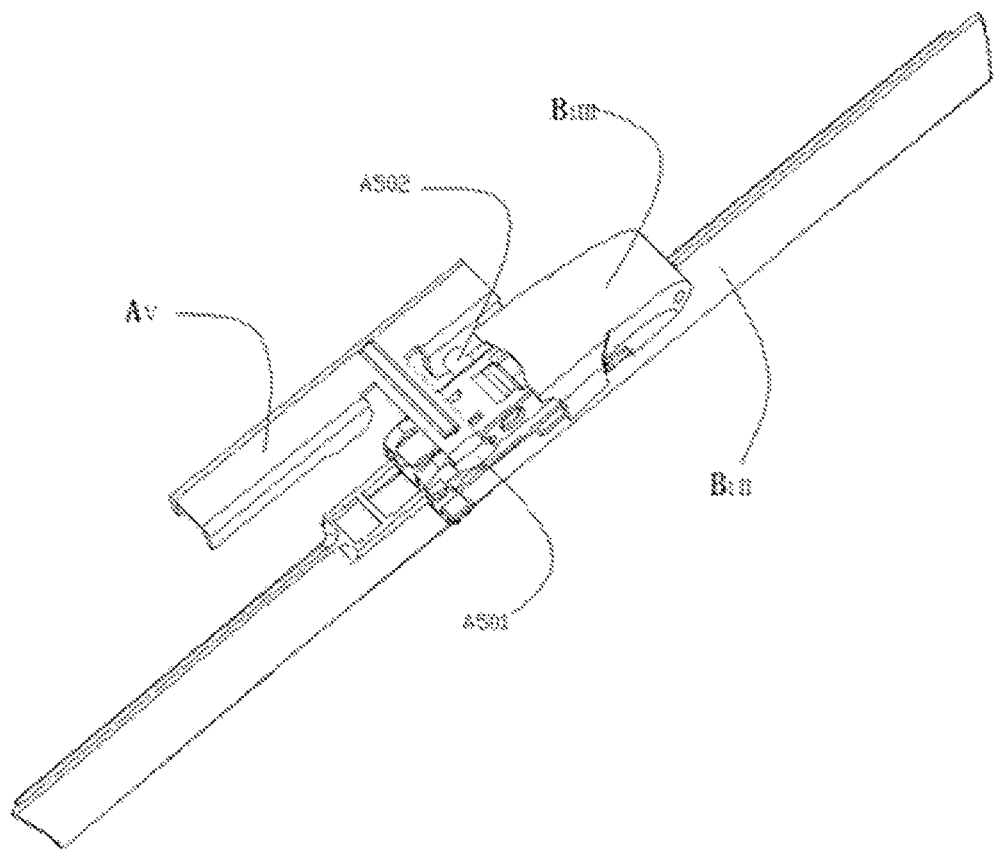
FIG. 20 is the structure diagram of adaptor I and side lock 22 in scheme V.
Figure 21:
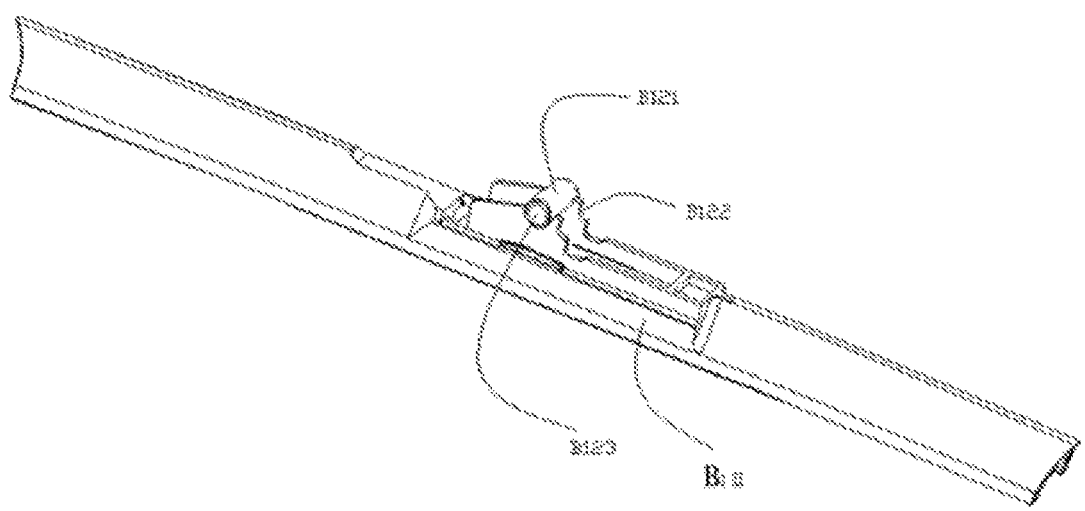
FIG. 21 is the structure diagram of holder in FIG. 20.

According to FIGS. 19-21, it shows scheme V: The side lock 22 (AV) will be matched with adaptor I (B1I). The side lock 22 (AV) is set with L-shaped hook on the top, with guide pillar (A502) provided under the L-shaped hook. The side lock 22 can be inserted into guide pillar casing (B123) of the holder bearing shaft (B121) for fixation purpose.

Figure 22:
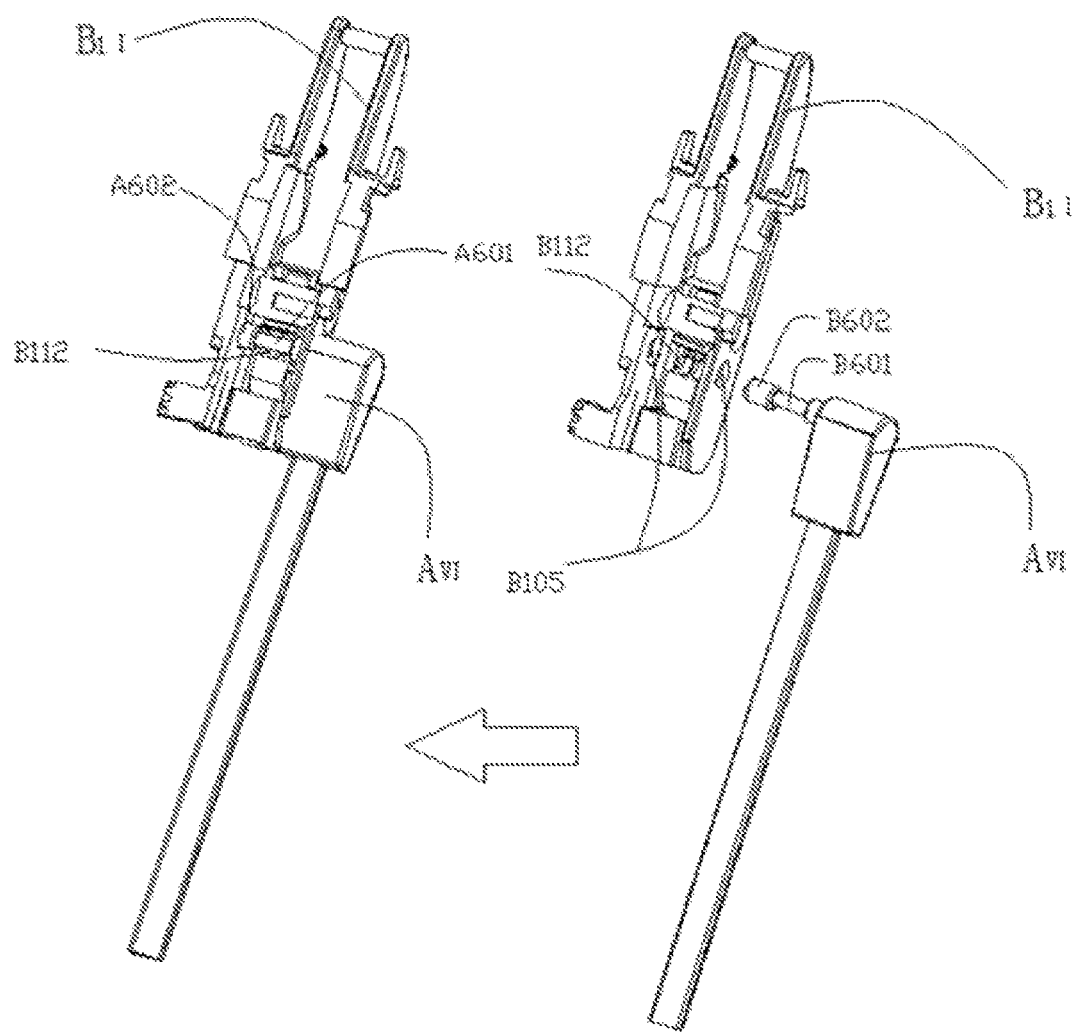
FIG. 22 is the structure diagram for assembly of adaptor I and side pin in scheme VI.
Figure 23:
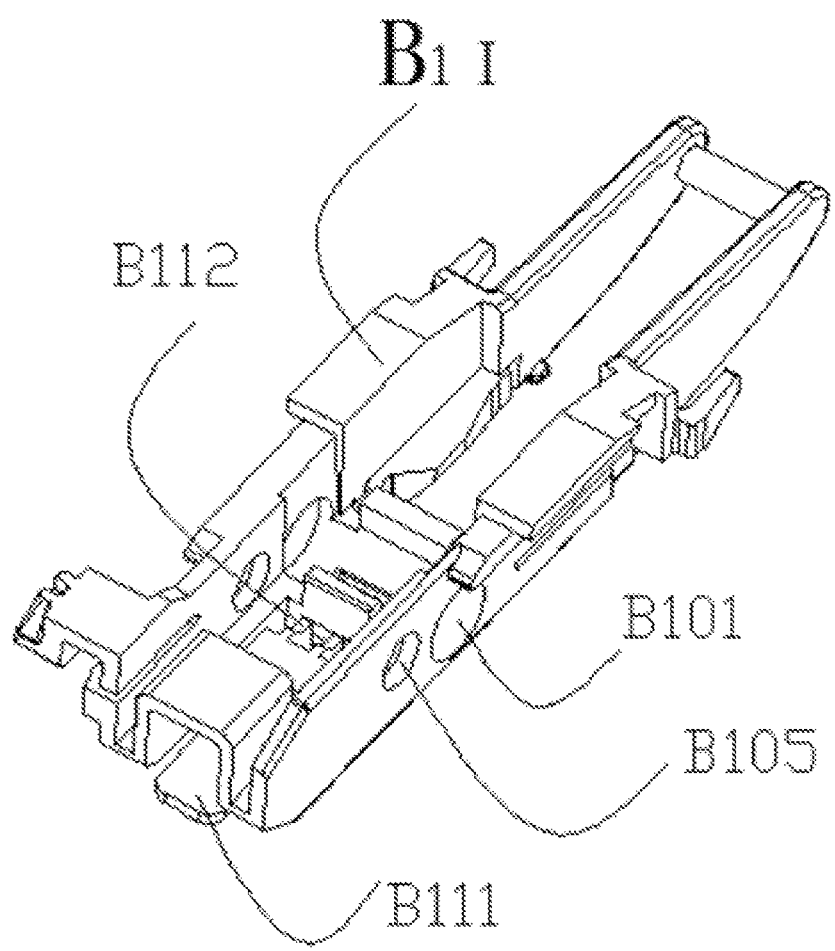
FIG. 23 is the structure diagram of adaptor in FIG. 22.
Figure 24:
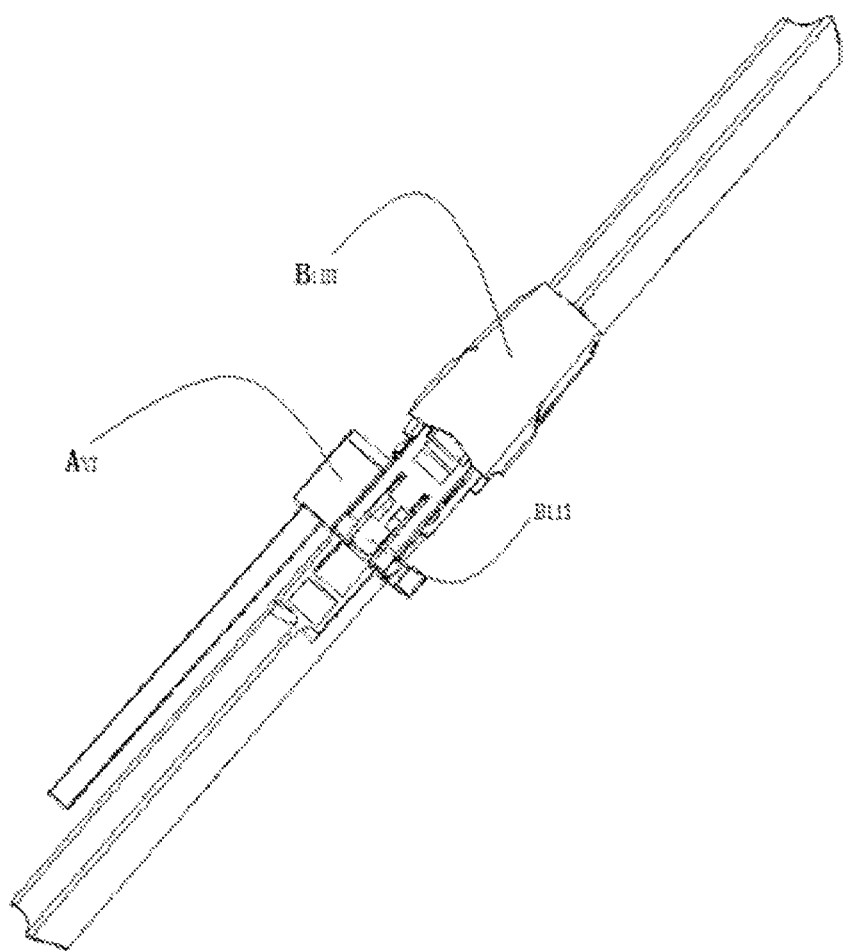
FIG. 24 is the top view of structure diagram for assembly of adaptor I and side pin in scheme VI.
Figure 25:
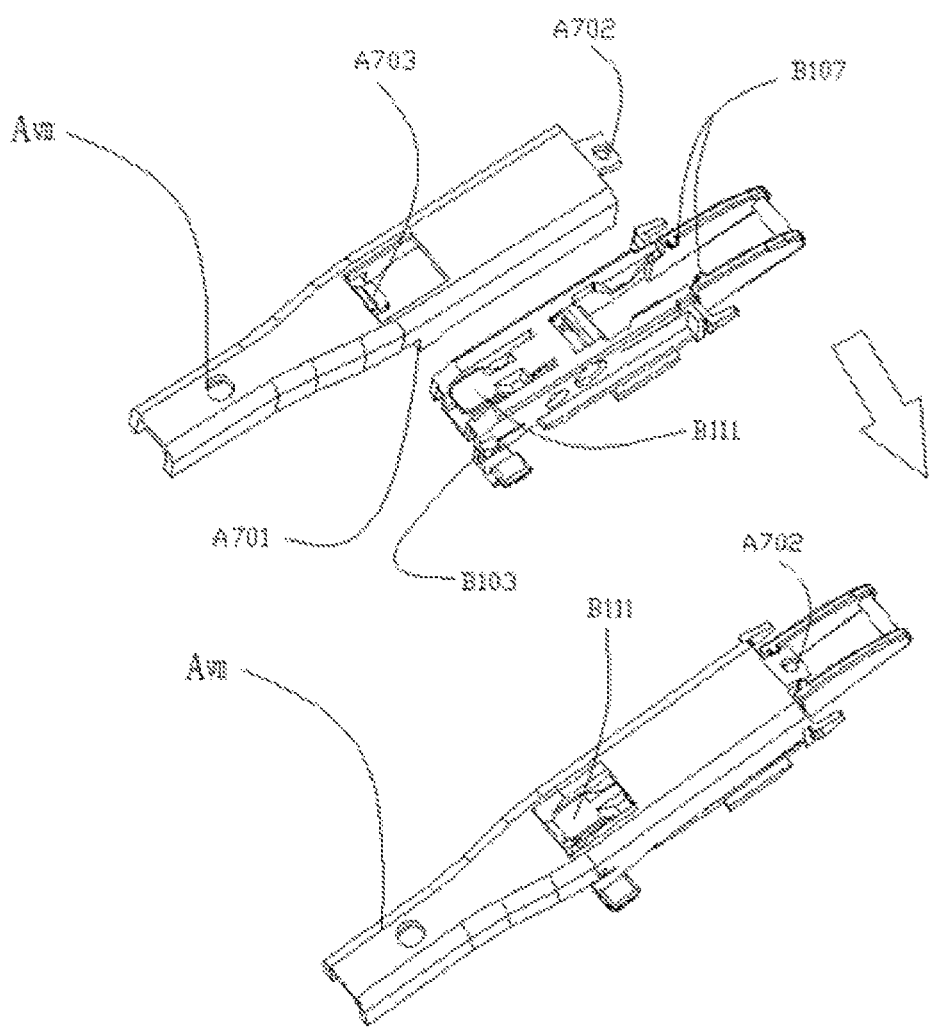
FIGS. 25 and 26 are the diagrams for assembly of adaptor II and pinch tab button in scheme VII.
Figure 26:
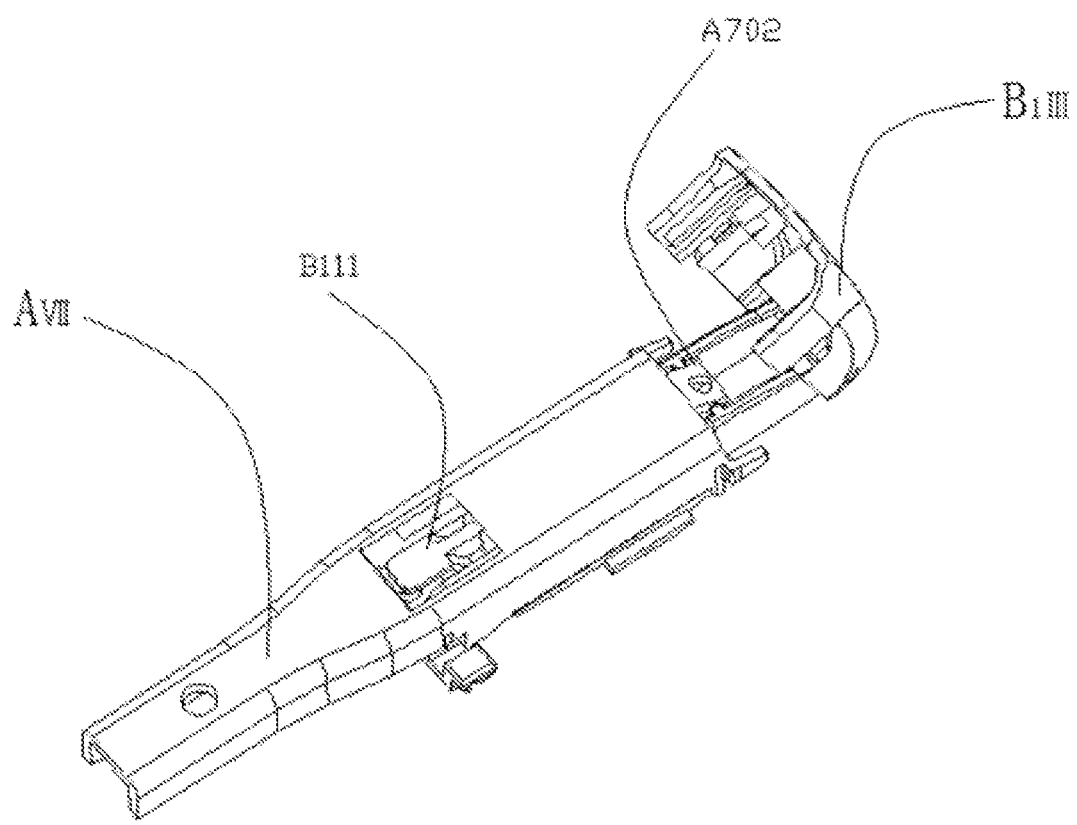

According to FIGS. 22-24, it shows scheme VI: The side pin (AVI) will be matched with adaptor I (B1I). The above-mentioned side pin (AVI) is set with shaft I (A601) on one side at the top, and the shaft is provided with a connecting shaft (A602). The side pin can be inserted into the connecting hole (B105) for connection and fixation purpose. The groove (B131) in the adaptor cover I (B1III) can rotate coordinately with the shaft (B106) of adaptor I (B1I), and the adaptor cover (B1III) can be pressed to press the buckle (B113) into the groove (B132) for fixation purpose;

According to FIGS. 25-26, it shows scheme VII: The pinch tab button (AVII) will be matched with adaptor I (B1I). The slot (A701) will be clamped on convex hull I (B103) of adaptor I (B1I), and the fixture block (A703) clamped under the pressing block (B111); besides, the pinch tab button (AVII) will be pressed to clamp the top convex block (A702) into the groove convex hull (B107) structure of adaptor I (B1I), as that the assembly will be completed.

Figure 27:
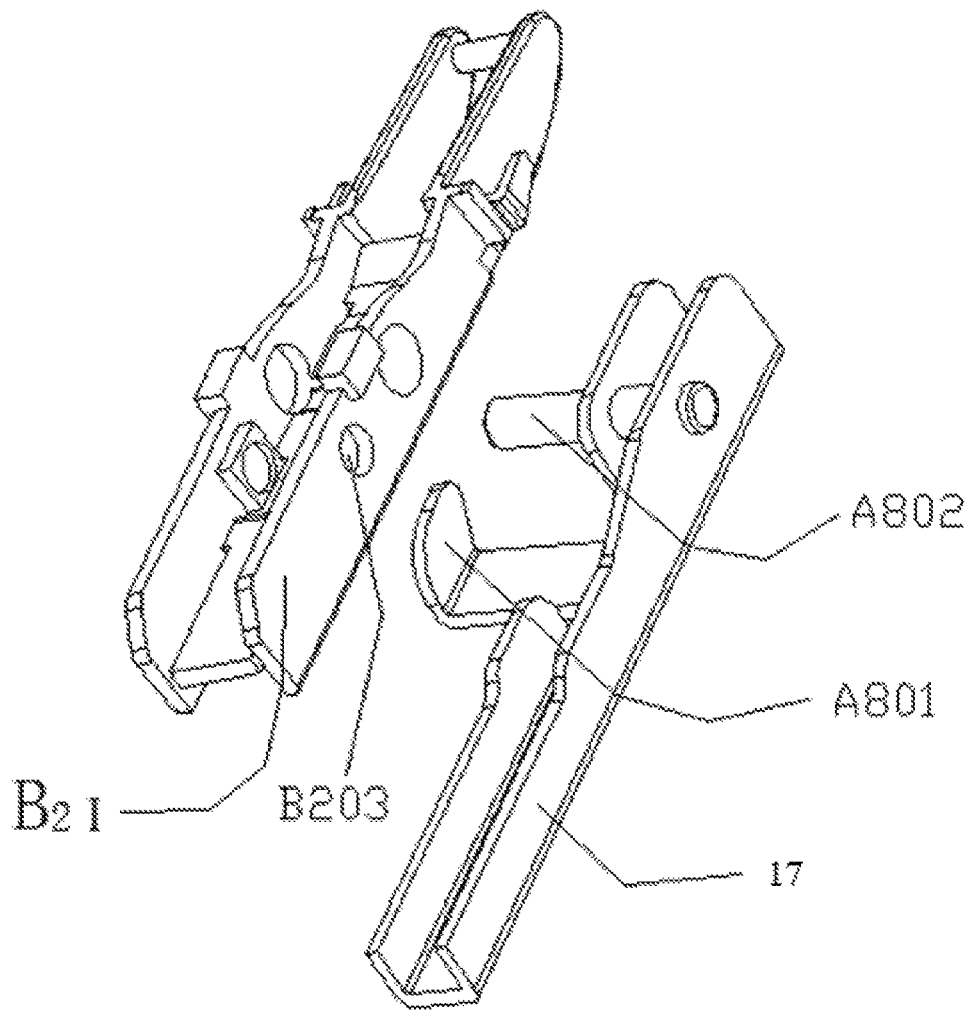
FIGS. 27, 28 and 29 are the diagrams for assembly of adaptor II and side lock in scheme VIII.
Figure 28:
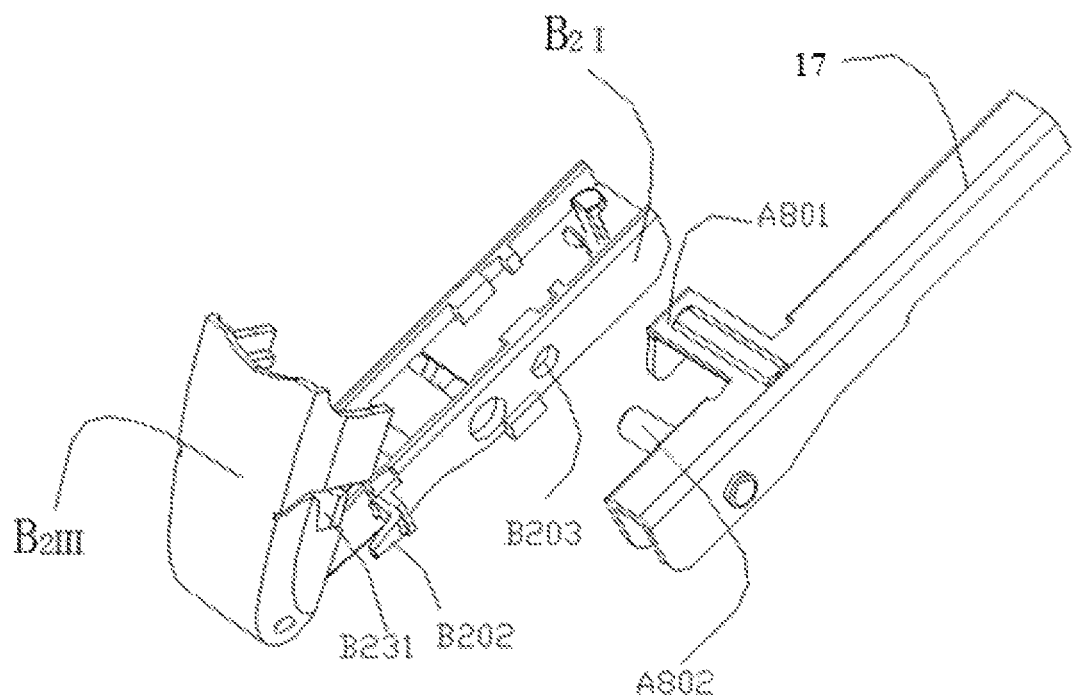
Figure 29:
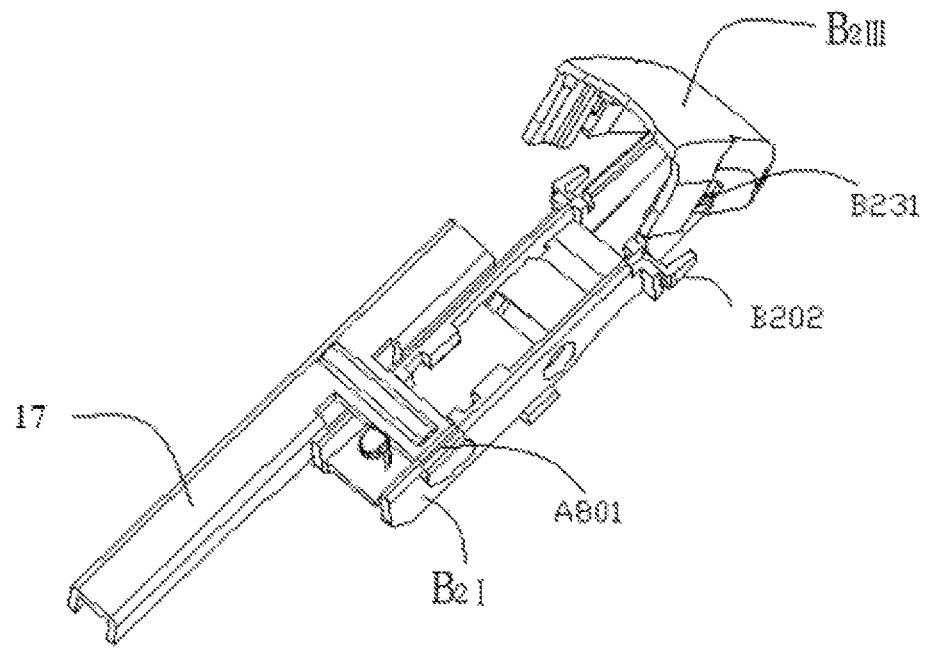

According to FIGS. 27-29, it shows scheme VIII: The side lock (AVIII) will be matched with adaptor I (B2I). The side lock (AVIII) is fitted with L-shaped hook (A801) and connecting shaft I (A802). The connecting shaft I (A802) can be inserted into the shaft hole (B203) of adaptor II (B2I), and the L-shaped hook (A801) will be clamped on the adaptor for fixation purpose.

Figure 30:
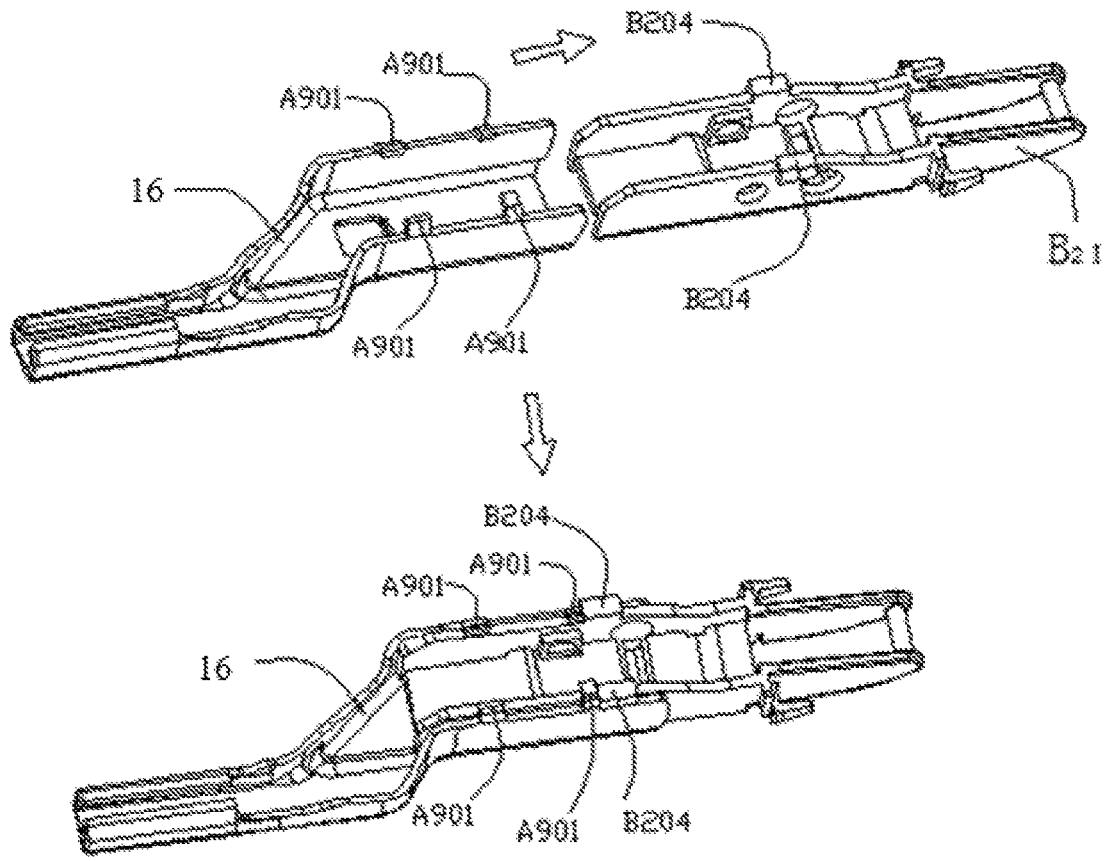
FIGS. 30 and 31 are the diagram for assembly of adaptor II and top lock in scheme IX.
Figure 31:
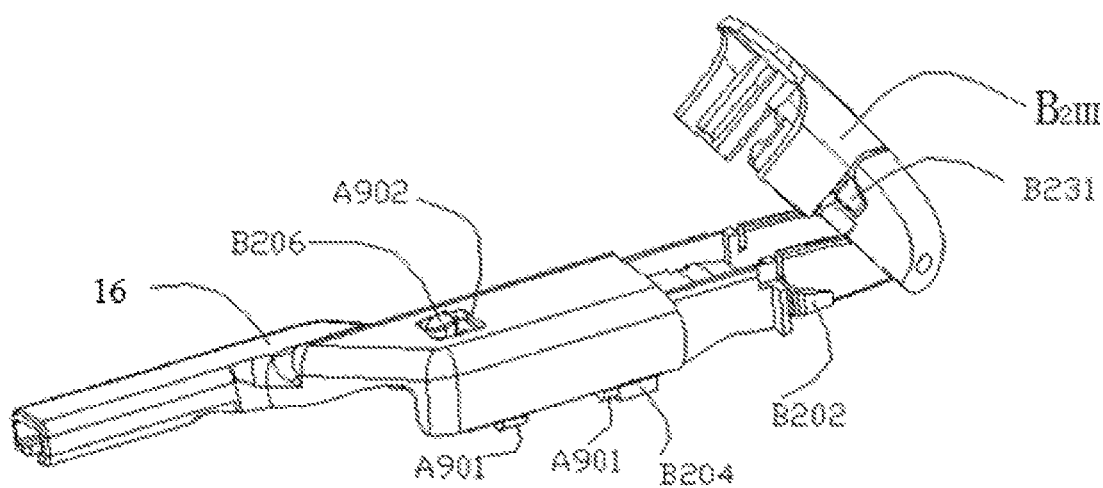

According to FIGS. 30-31, it shows scheme IX: The top lock 16 will be matched with adaptor I (B2I). The top lock 16 is set with a square convex plate hole (A902), and provided with four groups of convex hull IV (A901) at the bottom on the inner side. Upon assembly, the top lock 16 (AIX) can be penetrated into adaptor II (B2I), so that its vertical movement will be restrained by the four groups of convex hull (A901) structure, and its forward direction restrained by the baffle plate (B204), and the convex plate (B206) will be clamped into the square convex plate hole (A902) to prevent its withdrawal.

Figure 32:
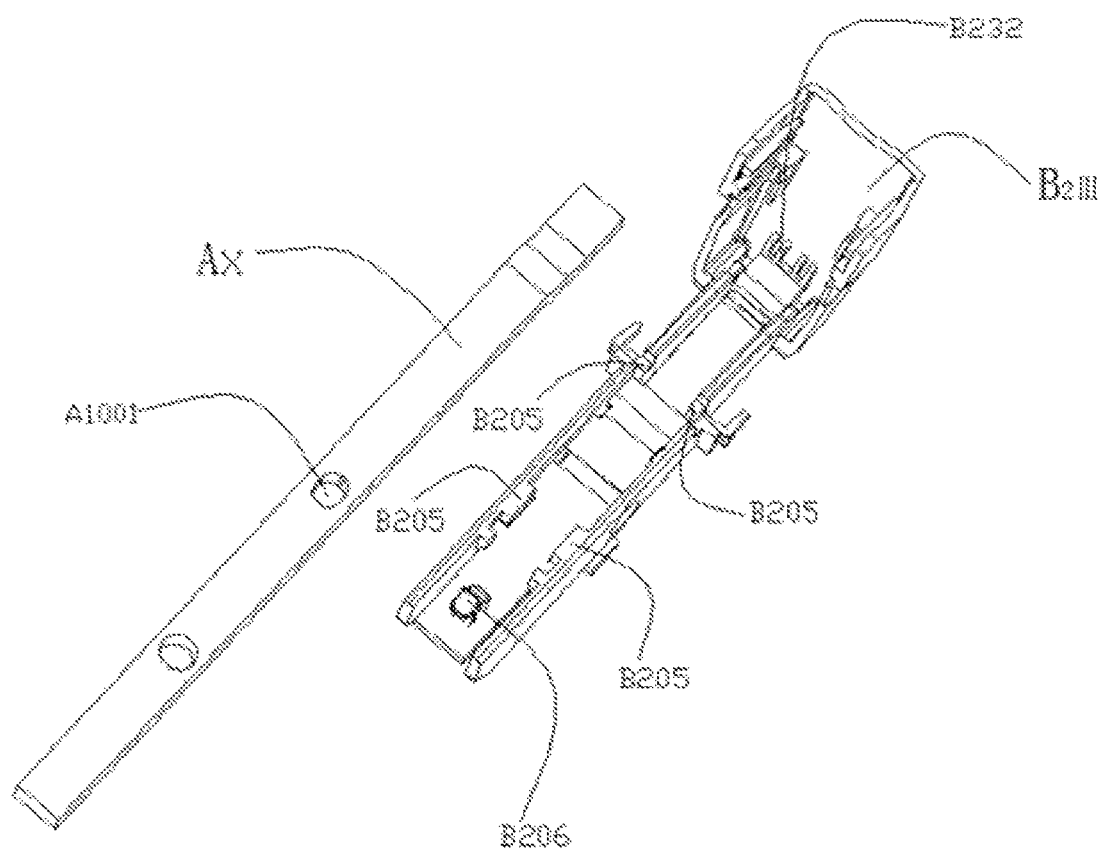
FIGS. 32, 33 and 34 are the diagrams for assembly of adaptor II and bayonet t in scheme X.
Figure 33:
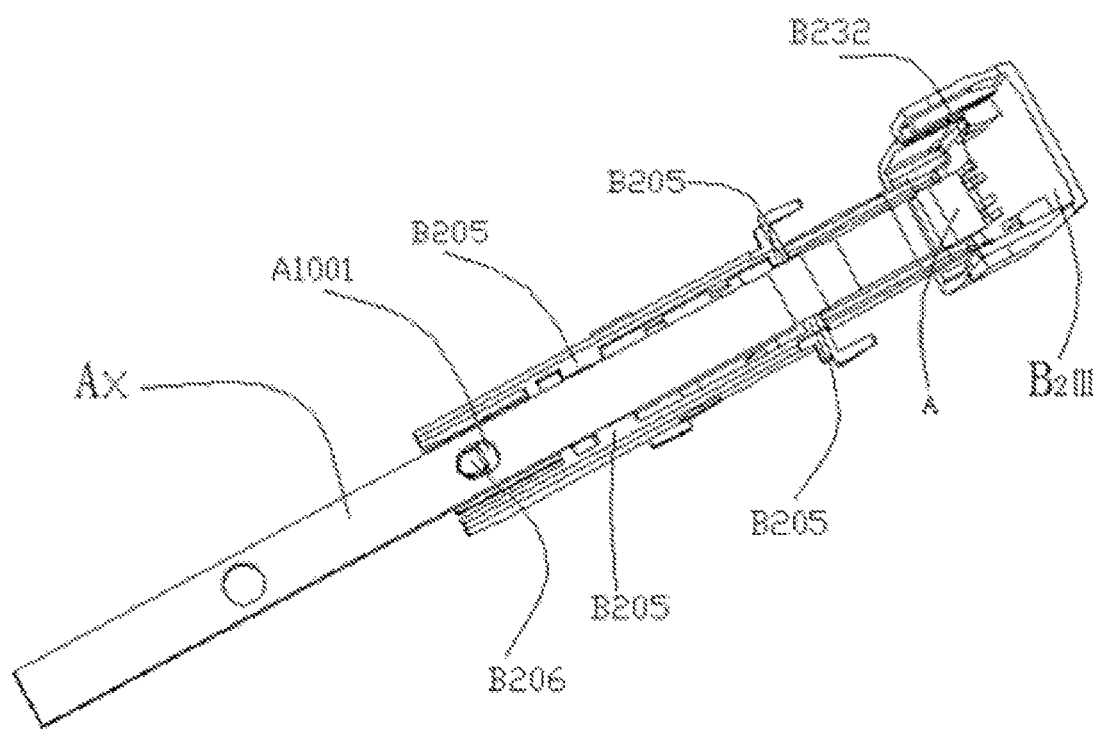
Figure 34:
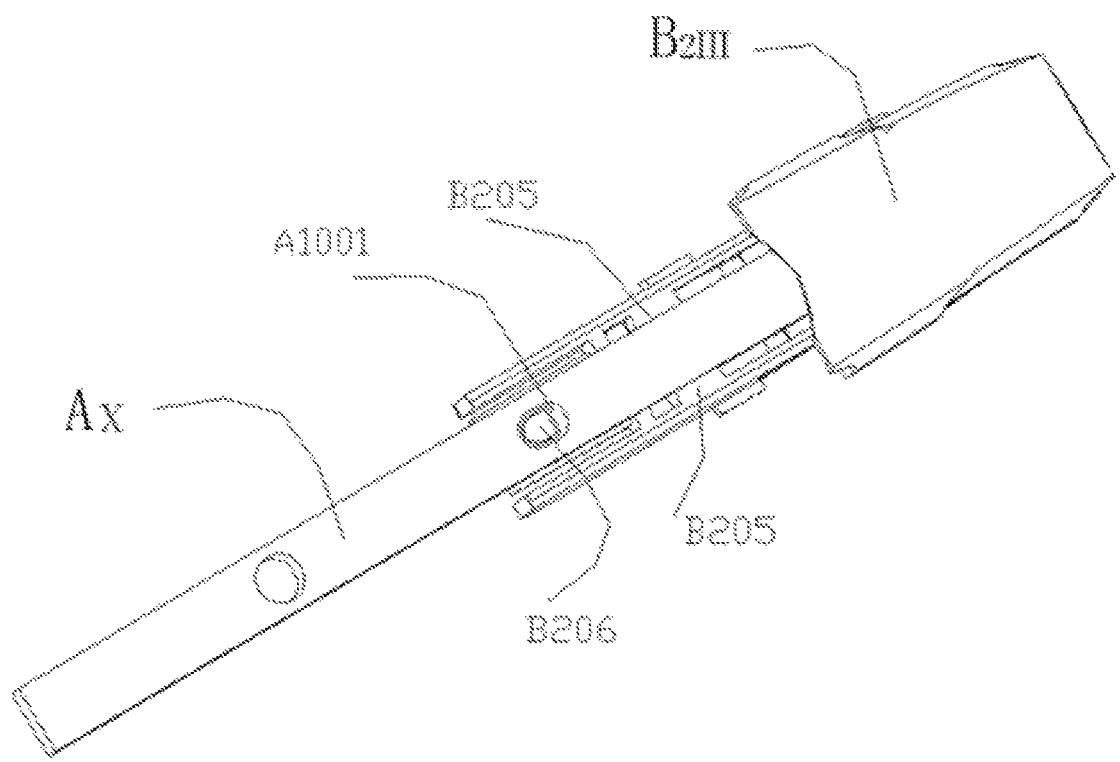

According to FIGS. 32-34, it shows scheme X: The bayonet (AX) will be matched with adaptor II (B2I). The bayonet (AX) is set with fixing hole at one end and round convex plate hole (1001) in the middle. The convex plate (B206) will be clamped into the round convex plate hole (A1001), so that the four groups of convex hull (B205) will restrain its lateral swaying. The adaptor cover (B2III) will be pressed at the end to press the cushion block (B232) at position A, and thus restrain its vertical movement. It features simple assembly and firm structure.

What is claimed is:

1. A vehicle wiper comprising:
    a wiper joint;
    an adaptor wherein the adaptor further comprises at least one connecting shaft hole;
    an adaptor cover;
    a holder wherein the holder further comprises:
        a bearing shaft which has a semi-hollow structure with one end closed, wherein the holder is clamped into the at least one connecting shaft hole on the adaptor;
        an internal guide pillar casing; and
        a chamfer on both ends of the bearing shaft;
    at least two fixture blocks fitted to the holder;
    at least two cushion blocks fitted to the holder;
    at least two side protecting covers fitted with a convex hull inside each protecting cover;
    a bone frame wherein the bone frame has two ends and both ends are fitted with two protecting cover connecting holes, wherein the convex hull of each side protecting cover is clamped into the protecting hole of the bone frame thereby coupling each side protecting cover with the bone frame;
    at least one card slot fitted on the bone frame;
    at least two rivet holes located on the bone frame;
    at least two buckles;
    at least two branches;
    at least two springs fitted wherein at least one spring is fitted inside each side protecting cover;
    a rubber; and
    wherein the fixture block of the holder is aligned with the card slot of the bone frame to firmly clamp the bone frame into the holder and the bone frame is in contact with the holder cushion block when clamped into the holder.

2. The vehicle wiper of claim 1 wherein the adaptor comprises:
    an adaptor connecting hole set beside the connecting shaft hole of the adaptor;
    a first convex hull;
    a second convex hull fitted inside a middle of the adaptor;
    a pressing block fitted on a top end of the adaptor;
    a u-shaped column fitted inside a middle of the adaptor;
    a groove convex block fitted on one side of the second convex hull;
    a cushion block groove fitted on one end of the adaptor;
    an axial compression groove fitted below the connecting hole of the adaptor;
    a shaft;
    a buckle fitted on a bottom end of the adaptor;
    a slideway fitted at a bottom edge of the adaptor;
    a first convex block; and
    a second convex block fitted outside the slideway.

3. The vehicle wiper of claim 2 wherein the adaptor cover comprises:
    a groove;
    a side groove; and
    a cushion block;
    wherein the groove and cushion block are set on the inner side of the adaptor cover and the side groove is set in the middle of the adaptor cover; the shaft of the adaptor is clamped into the groove of the adaptor cover such that the adaptor cover rotates freely along the shaft of the adaptor; the adaptor cover can be pressed down to clamp the buckle of the adaptor into the side groove of the adaptor cover.

4. The vehicle wiper of claim 2 wherein the wiper joint comprises a 9×3 U-hook wherein the 9×3 U-Hook is clamped into the U-shaped column by the adaptor and is limited and fixed by the second convex hull.

5. The vehicle wiper of claim 2 wherein the wiper joint comprises a 9×4 U-hook wherein the 9×4 U-Hook is clamped into the U-shaped column by the adaptor and is limited and fixed by the second convex hull.

6. The vehicle wiper of claim 2 wherein the wiper joint comprises a pinch tab 22 wherein the pinch tab is clamped on the first convex hull of the adaptor by pressing down the pinch tab to fix the top convex block and groove convex block.

7. The vehicle wiper of claim 2 wherein the wiper joint comprises a top lock 22 wherein the top lock 22 is penetrated into the adaptor along the slideway, the fore and aft movement of the top lock 22 is restricted by the convex blocks, the top lock is inserted into the connecting shaft hole.

8. The vehicle wiper of claim 2 wherein the wiper joint comprises a side pin with a shaft on one side at the top, the shaft further comprising a connecting shaft, wherein the side pin can be inserted into the connecting shaft hole of the adaptor for connection and fixation purposes.

9. The vehicle wiper of claim 2 wherein the wiper joint comprises:
    a pinch tab button further comprising;
        at least one slot;
        a fixture block; and
    a top convex box;
    wherein the fixture block of the pinch tab button is clamped below the pressing block of the adaptor, when the pinch tab button is pressed down the top convex block is fixed with the grove convex block.

10. The vehicle wiper of claim 1 wherein the adaptor comprises:
    at least two ends and at least two lateral sides;
    at least two fixture blocks with at least one fixture block located on each lateral side of one end of the adaptor;
    a holder hole set beside the connecting shaft hole of the adaptor;
    a baffle plate set on both inner sides of the adaptor between the holder hole and the connecting shaft hole of the adaptor;
    a shaft set at one end of the adaptor;
    a convex plate set at an end of the adaptor opposite of the shaft; and
    a convex hull set symmetrically between the holder hole and the connecting shaft hole of the adaptor.

11. The vehicle wiper of claim 10 wherein the adaptor cover comprises:
    a c-shaped axial groove;

a side groove; and a cushion block;

wherein the c-shaped axial groove and cushion block are set at one inner end of the adaptor; the side groove is located on both outer sides of the end of the adaptor opposite of the c-shaped groove and cushion block.

12. The vehicle wiper of claim 11 wherein the wiper joint comprises a bayonet, the bayonet further comprising a convex plate hole;

wherein the convex plate of the adaptor is clamped into the convex plate hole and the left and right movement of the bayonet is limited by the convex hull and the vertical movement is limited by pressing down on the adaptor cover and pressing the cushion block.

13. The vehicle wiper of claim 10 wherein the wiper joint comprises a top lock, the top lock comprising four groups of convex hull structure wherein the top lock is penetrated into the adaptor; the top lock's vertical movement is restricted by the four groups of convex hull structure and the top lock's forward movement is restricted by the baffle plate and the convex plate clamped into a convex plate hole of the top lock.

14. The vehicle wiper of claim 10 wherein the wiper joint comprises a side lock, the side lock comprising:

an L-shaped hook; and a connecting shaft located on one side of the L-shaped hook.

15. The vehicle wiper of claim 1 wherein the wiper joint comprises a side lock 22 wherein the side lock is inserted into the connecting hole of the adaptor.

* * * * *